UNITED STATES PATENT OFFICE.

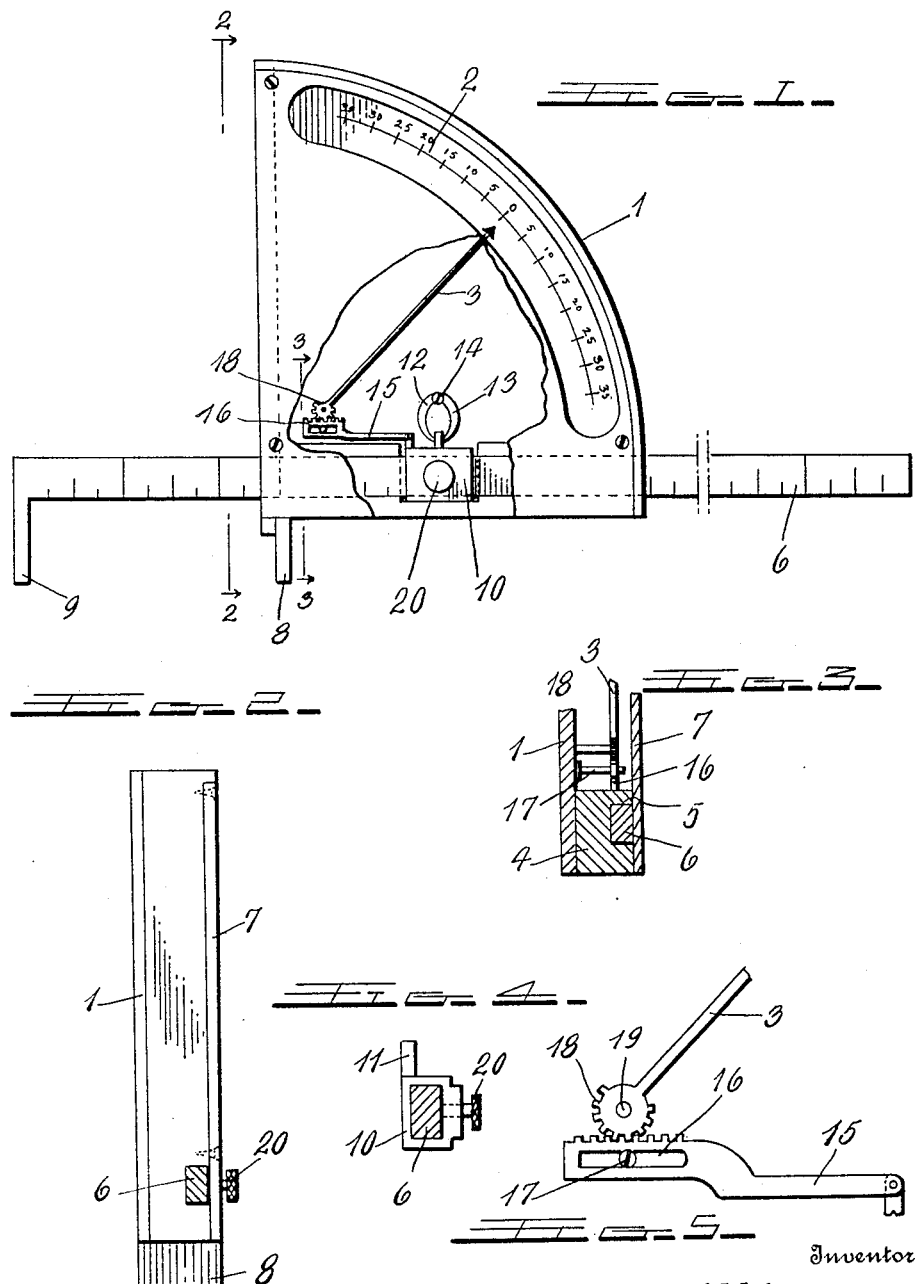

EDWARD HUGH WILLIAMS, OF NEW ORLEANS, LOUISIANA.

MICROMETER-GAGE.

1,396,614.   Specification of Letters Patent.   Patented Nov. 8, 1921.

Application filed October 26, 1920. Serial No. 419,730.

*To all whom it may concern:*

Be it known that I, EDWARD HUGH WILLIAMS, a citizen of the United States, residing at New Orleans, in the parish of Orleans and State of Louisiana, have invented certain new and useful Improvements in Micrometer-Gages; and I do hereby declare the following to be a full, clear, and exact description of the invention, such as will enable others skilled in the art to which it appertains to make and use the same.

The present invention relates to improvements in micrometer gages, and has for an object to provide an improved gage of this character in which variations in the width or other dimension of work may be accurately ascertained and such variations corrected accordingly.

The invention pertains more particularly to that class of micrometer gages which includes a casing having a slidable ruler and a pointer moving over a graduated scale in such a way that work placed between the ruler and casing may have any variations in its thickness registered by the pointer moving over the scale carried by the casing.

The novelty in the present invention resides in a peculiar connection between the ruler and the pointer operating mechanism which permits the ruler to be adjusted with respect to such operating mechanism and in which a spring device is employed to subsequently hold the mechanism, and incidentally the pointer, in an initial or zero position on the scale.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a view in elevation with parts broken away of an improved micrometer gage constructed in accordance with the present invention;

Fig. 2 is a sectional view taken on the line 2—2 in Fig. 1;

Fig. 3 is a similar view taken on the line 3—3 in Fig. 1;

Fig. 4 is a sectional view through the ruler and block; and

Fig. 5 is an enlarged view of the pointer operating mechanism.

Referring more particularly to the drawings, 1 designates a casing of the usual character being substantially segment shaped and having a scale 2 represented thereon over which a pointer or index 3 is adapted to move. The casing 1 is provided in the usual manner with a block 4 along its lower edge in which is formed a recess 5 to slidably receive a ruler 6 also provided with graduations.

A cover plate 7 closes the casing 1 and the recess 5 and holds the ruler 6 in place. Any suitable fastening means is used to hold the cover plate 7 in place. The casing carries a lug 8 depending therefrom and adapted to coöperate with a similar lug 9 on one end of the ruler 6. The work, as for instance a piston ring, is adapted to be fitted between the lugs 8 and 9 as presently described.

In accordance with the present invention the ruler 6 is adapted to have slidable movement through a block 10 provided with a projection 11 extending vertically upward from the block and arranged to be engaged by the free ends of a pair of spring arms 12 and 13. The spring is preferably of the yoke character being secured at its intermediate part as by a screw or other fastening 14. The function of the spring is to hold the block 10 yieldingly in an intermediate or initial position where the pointer 3 will be at the zero graduation on the scale 2.

Connected to one end of the block is a link 15 having a slotted rack 16 in the open portion of which is engaged a screw or other guide means 17 for supporting the rack in engagement with an interrupted pinion 18 formed on one end of the pointer 3 and which has a partial rotation about an axis 19. The block 10 carries a set screw 20 by which the ruler may be secured therein.

In use, the set screw 20 is loosened to permit the ruler to be drawn out toward the left in Fig. 1 in order to secure the proper spacing of the lugs 8 and 9. These lugs, for instance, may receive a piston ring or other work. The set screw 20 is thereupon tightened, and the springs 12 and 13 will hold the ruler in an initial position with the pointer 3 at zero. The piston ring is then drawn through the lugs 8 and 9, and any inequalities in its width will cause the divergence farther apart of the lugs 8 and 9, thus causing the ruler to move toward the left and with it the rack 16.

This rack, meshing with the pinion 18, will cause a deflection of the pointer 3 over the scale 2 which will show thereon the degree of the variation. The spring devices 12 and 13 will allow of this movement, but will restore the ruler to the correct position after the unequal portion of the piston ring is passed.

Of course the gage can be used for many other uses, as will be apparent to those skilled in this art. It is especially useful for aiding an operator to easily cut off packing rings of a uniform width inasmuch as the width of the ring can be measured in the course of being cut off. The instrument is also useful in grooving piston heads and can be employed as a depth gage. The dial of the instrument preferably indicates in thousandths of an inch, although other arrangement of graduations may be made.

I have described preferred and satisfactory constructions, but it will be obvious that various changes and modifications may be made without departing from the spirit of the invention, provided such changes are within the scope of the appended claims.

What is claimed is:

1. A micrometer gage comprising a casing having a recessed block in its lower edge and a scale along one side thereof, a ruler slidable in the recess in said block, lugs on said casing and ruler, a second block mounted within the casing and being relatively movable to said first mentioned block, and to the ruler, said ruler slidably fitting through the last mentioned block, means carried by the last mentioned block for clamping the latter to said ruler, a rack permanently connected to said second mentioned block, a pointer in the casing adapted to move over said scale and having teeth adapted to engage with said rack, and spring means within the casing acting on said second mentioned block to hold the same in an intermediate initial position, substantially as described.

2. A micrometer gage of the character described comprising a substantially segment shaped casing having a scale along its curved edge, an elongated block secured along the lower edge of said casing and provided with a recess, a cover plate for closing said recess, a ruler slidable in said recess, legs on the casing and said ruler, a second block of shorter length fitted in the casing and being movable with respect to said first mentioned block and also movable with respect to said ruler, the ruler being slidable through said second mentioned block, means carried by the second mentioned block to secure the latter to the ruler, said second mentioned block having a lug extending upwardly therefrom, a bow spring having its intermediate part secured in the casing with its free ends engaging opposite sides of said lug, a rack bar slidable in said casing and being permanently connected to said second mentioned block, a pointer pivoted in the casing and moving over said scale, said pointer provided with teeth engaging said rack, substantially as described.

EDWARD HUGH WILLIAMS.